RINGING ARRANGEMENT WITH VARIABLE INTERVALS

Filed Oct. 12, 1966

INVENTORS: A. FEINER
W. ULRICH
BY
Charles H Davis
ATTORNEY

RINGING ARRANGEMENT WITH VARIABLE INTERVALS

Filed Oct. 12, 1966 4 Sheets-Sheet 3

RINGING ARRANGEMENT WITH VARIABLE INTERVALS

Filed Oct. 12, 1966 4 Sheets-Sheet 4

United States Patent Office 3,492,436

Patented Jan. 27, 1970

3,492,436
RINGING ARRANGEMENT WITH VARIABLE INTERVALS

Alexander Feiner, Chicago, Ill., and Werner Ulrich, Berkeley, Calif., assignors to Bell Telephone Laboratories, Incorporated, Murray Hill and Berkeley Heights, N.J., a corporation of New York Filed Oct. 12, 1966, Ser. No. 586,267
Int. Cl. H04m *3/00, 1/00*
U.S. Cl. 179—18 11 Claims

ABSTRACT OF THE DISCLOSURE

An arrangement for ringing telephone stations is disclosed. A ringing control circuit is shared by a plurality of trunks and is coupled to each trunk only during a ringing interval. The length of the ringing interval is determined by the number of trunks requiring ringing.

Figure 1:
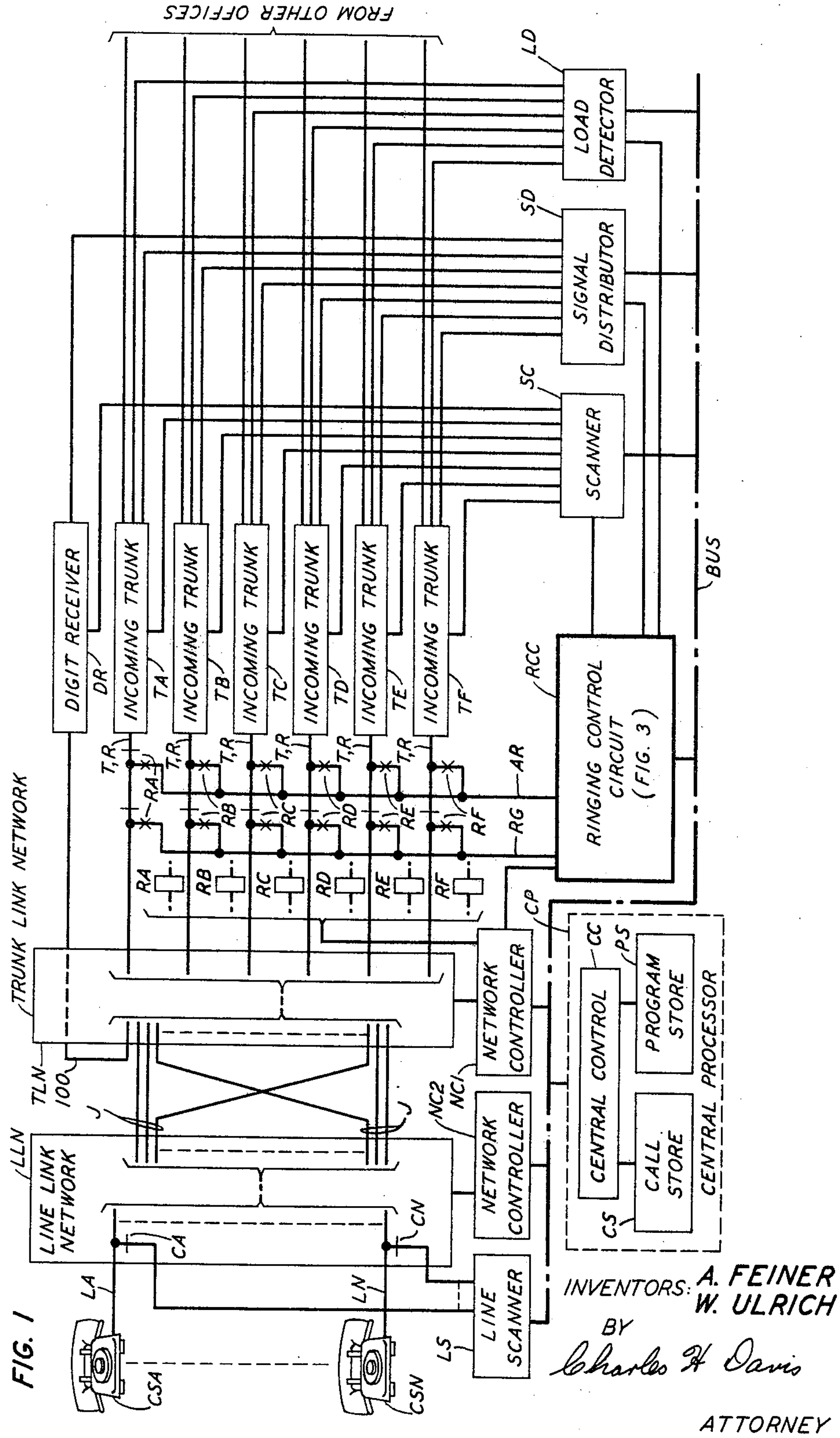

This invention relates to telephone signaling arrangements and particularly to arrangements for signaling a called customer station as to the presence of an incoming call.

In a more particular aspect, this invention relates to arrangements for actuating an electro-responsive device, such as a telephone ringer, at a called telephone station.

Typically, present day telephone switching systems provide apparatus at the switching office for transmitting a ringing signal to the customer's station to alert the customer thereat as to the presence of an incoming call. The ringing signal generally comprises intermittent periods during which ringing current is transmitted over the customer's line to the called station to actuate a transducer at the station. The transducer is an electro-acoustical device which converts the ringing current into an audible signal to alert the called customer. In many well-known switching systems, for example, the ringing signal comprises a two-second burst of ringing current every six seconds thus providing two-second periods of audible ringing separated by four-second silent intervals.

The manner in which the ringing current is transmitted over a called line varies with different types of switching systems. In some systems found in the prior art the ringing is controlled by the individual trunk circuits which are used to interconnect the calling and called stations. More specifically, in one well-known telephone system the ringing power source is connected to one coordinate of a ringing selection switch of the crossbar type, and the trunk circuits are connected to the other coordinate. When ringing is required on a particular trunk, the appropriate coordinates of the ringing selection switch are operated to supply ringing current over the trunk to the called station. With this type of ringing arrangement certain facilities must be provided in each trunk circuit, such as, the ringing trip relay which responds when the called station answers to interrupt the ringing signal.

Since the interval during which a trunk is in its ringing mode is short relative to the overall holding time of the trunk, it will be realized that those trunks that are individually equipped to furnish their own ringing will have their ringing equipment idle most of the time.

As an alternative to equipping each trunk with ringing facilities or access to a ringing generator via a ringing selection switch, arrangements have been devised for providing the ringing from a special service circuit. One such arrangement is disclosed in the copending application of L. F. Goeller, Jr., Ser. No. 403,989, filed on Oct. 15, 1964, now Patent 3,378,650. In that application, there is disclosed a ringing control circuit which is connected over the switching network to the called customer's line for performing various tests on the line and for transmitting ringing current to the called station. In accordance with the Goeller disclosure, when the called station responds to the ringing signal the central control disconnects the called station from the ringing control circuit and connects the called station over the network to the trunk to which the calling station is connected.

An improvement of the arrangement shown in the Goeller application is disclosed in the copending application of A. Feiner, Ser. No. 586,266, filed on Oct. 12, 1966. In the Feiner arrangement separate network connection to a ringing control circuit are not required, but instead, the called lines are connected directly to the trunks which are associated with a common ringing control circuit. The central control actuates a relay gate to momentarily couple the ringing control circuit to the trunk for a fixed interval to provide the necessary ringing current.

While the aforementioned Feiner and Goeller disclosures have provided common ringing facilities and thus eliminated the need for special ringing selection switches and for ring trip relays individual to each trunk circuit, these arrangements lack certain novel features which we have incorporated in the present invention. For example, in the Feiner disclosure the ringing control circuit is coupled to the trunk for a fixed interval to provide a ringing current to actuate the ringer at the called station. In telephone systems using a ringing signal comprising a two-second ringing interval every six seconds, only three trunks can be served simultaneously from the same ringing control circuit. In other words, only one trunk can be rung by a ringing control circuit at any given time. While the first trunk is experiencing the four-second silent interval between successive two-second ringing periods, two other trunks can be individually rung for two seconds each before the first trunk must be rung again.

It is therefore an object of our invention to increase the number of communication circuits that can share a common ringing facility.

In accordance with one illustrative embodiment of our invention a ringing control circuit is associated with a plurality of trunk circuits in a telephone switching system. A stored program controlled data processor cooperates with the trunk circuits and other equipment to establish connections through the switching network to interconnect the trunk circuits with customer lines. When the trunk circuit is connected to a called customer line, a ringing signal must be transmitted over the line to actuate the ringer at the called station and alert the customer thereat. The ringing function is accomplished in the present invention by sequentially coupling the ringing control circuit to those trunks which require ringing. Normally, the ringing control circuit is connected to a trunk for a period of two seconds out of every six seconds to provide a two-second audible ringing signal followed by a four-second silent interval for each trunk. If this ringing code were adhered to, however, only three trunk circuits could be simultaneously served by a ringing control circuit. More specifically, assuming that three hypothetical trunk circuits TA, TB and TC are to be rung, trunk TA would be coupled to the ringing control circuit for a two-second interval to actuate the ringer of the called station connected to that trunk. During the four-second silent interval on trunk TA, each of trunks TB and TC could be individually coupled to the ringing control circuit for a two-second period to provide the lines connected to trunks TB and TC with a two-second ringing burst. After the trunk TC was furnished with a two-second ringing interval and was beginning a four-second silent interval, trunk TA could be rung again with another two-second burst of ringing current.

In accordance with one feature of our invention load detecting means is provided for ascertaining the number of trunks associated with a particular ringing circuit that requires ringing current. For example, if only trunks TA, TB, and TC require ringing, each trunk could be furnished with a two-second burst of ringing current every six seconds. As more trunks become busy, say trunks TA, TB, TC, and TD, the interval that ringing current is present on a trunk could be reduced from two seconds to 1.5 seconds. In this manner, each of the four trunk circuits would be given a 1.5 second ringing burst every six seconds. As further trunks require ringing, the interval that the ringing control circuit is coupled to each trunk could be further shortened or in the alternative, the silent interval between successive ringing bursts on each trunk could be lengthened to permit more trunks to be serviced by the same ringing control circuit.

It has been observed that in many instances the called customer responds quickly to a ring signal and the transmission of several ringing bursts over a line is not required. Any alteration of the ringing and silent intervals would, therefore, only be of a temporary nature since as the called customers responded to the ringing signals on the various trunks, these trunks would free the shared ringing control circuit to serve other trunks.

A feature of our invention is found in means for dynamically altering a ringing signal in a shared ringing control circuit to permit the ringing control circuit to serve more customer lines.

Figure 2:
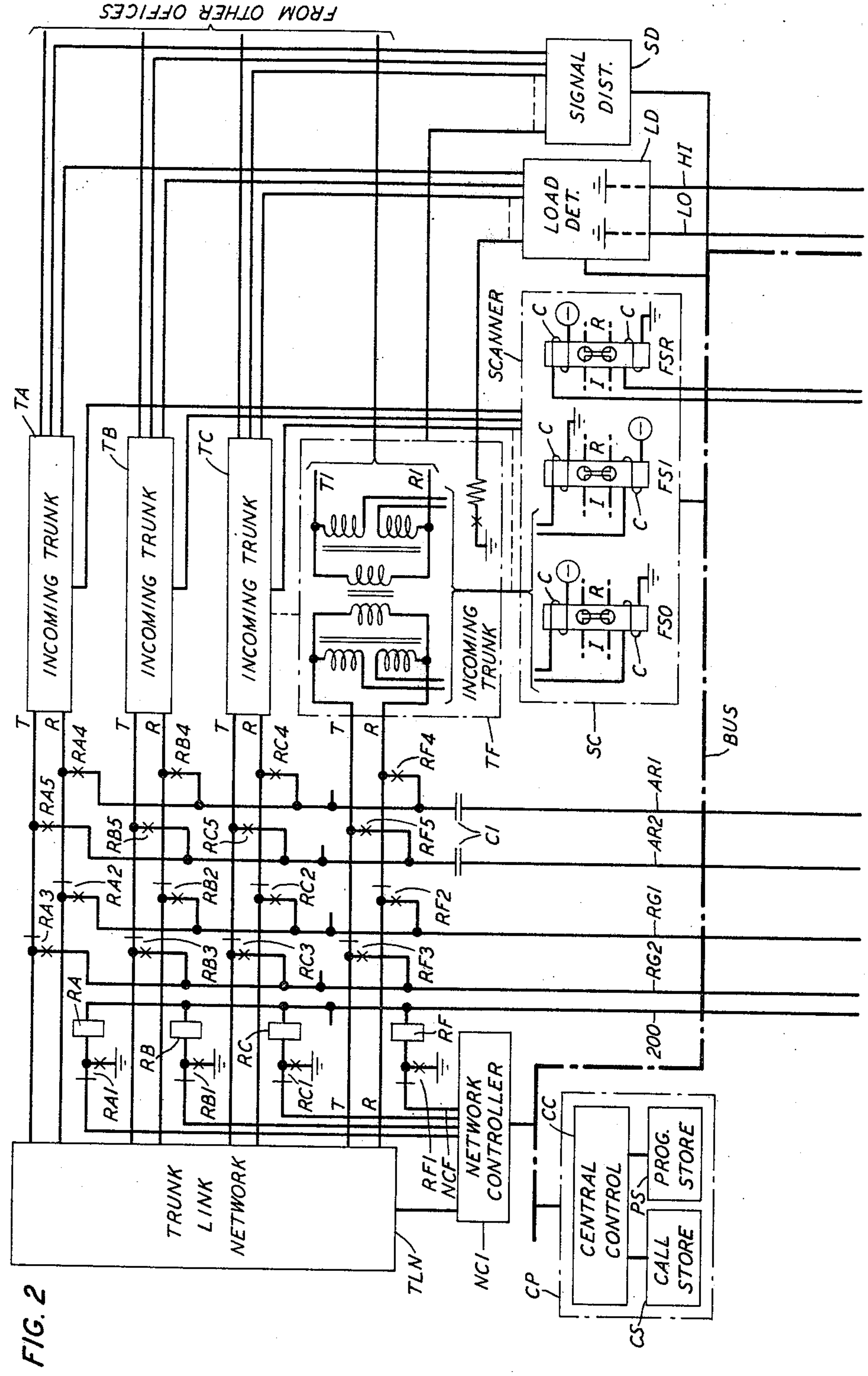
Figure 3:
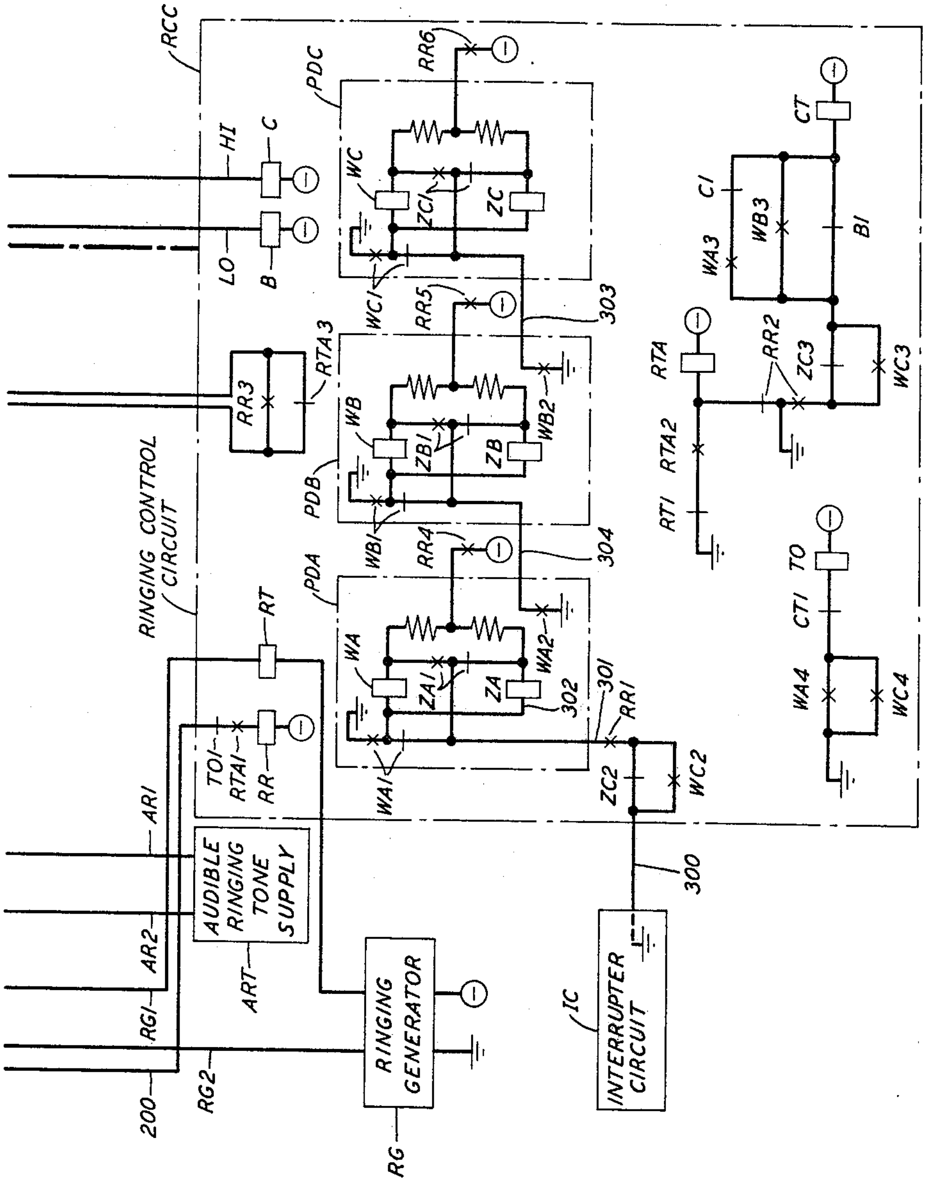
Figure 5:
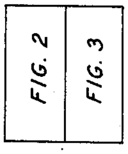

These and other objects and features of the invention will become readily apparent from the following description read with reference to the drawing, in which:

FIG. 1 shows, in block diagram form, a program controlled telephone switching system employing the invention;

FIGS. 2 and 3, when arranged in accordance with FIG. 5 show a schematic representation of one specific illustrative embodiment of the invention including a load detector, a ringing control circuit, and circuitry for controlling the ringing circuit in accordance with the number of trunks requiring a ringing signal; and FIGS. 4A through 4D are sequenced diagrams illustrating the intervals during which certain equipment is operated to provide a variable ringing signal.

The specific illustrative embodiment of our invention disclosed herein may advantageously be incorporated in a program controlled electronic switching system of the type disclosed in the Bell System Technical Journal, vol. XLIII of September 1964 and also disclosed in the copending patent application of A. H. Doblmaier-R. W. Downing-M. P. Fabisch-J. A. Marr-H. F. May-J. S. Nowak-F. F. Taylor-W. Ulrich, Ser. No. 334,875, filed Dec. 31, 1963. The Bell System Technical Journal article, the Doblmaier et al. disclosure and the patent applications cited therein are hereby incorporated by reference as through fully disclosed herein. While the cited Doblmaier et al. disclosure and the references cited therein may be consulted for a more complete understanding of the construction and operation of an electronic switching system, a full understanding of that switching sysstem is not necessary for an appreciation of the nature and scope of our invention. However, to aid the reader a brief and general description of that system will now be given with reference to FIG. 1.

BRIEF DESCRIPTION

The electronic switching system shown in FIG. 1 is designed to serve many customer stations such as stations CSA and CSN. These stations are connected to the switching office over lines, such as lines LA and LN, which terminate in the line link network LLN and the line scanner LS. The line scanner LS is employed for sensing on-hook and off-hook signals representing requests for service from the customers at stations CSA and CSN.

The line link network LLN comprises switching facilities for establishing communication paths between the customer lines and the trunk link network TLN over junctors J. The trunk link network TLN has similar switching facilities for interconnecting junctors J with trunk circuits such as incoming trunk circuits TA–TF. While only trunk circuits for trunks incoming from other offices have been shown in FIG. 1, it will be realized that intraoffice trunks and trunk circuits for trunks outgoing to other offices as well as service circuits may also be terminated in trunk link network TLN.

As set forth in the above-mentioned Doblmaier et al., disclosure, the logic, control, storage, supervisory and translating functions that are required for the operation of the system are performed by a common control equipment comprising central processor CP. Accordingly, a minimal amount of control circuitry is needed in the individual trunk circuits and this circuitry can be actuated by a signal distributor SD which acts as a buffer between the high speed central processor CP and the slower speed control circuits of the trunks.

In a similar fashion buffer circuits designated herein as network controllers NC1 and NC2 have been provided between the ringing control circuit, the trunk and line link networks and the central processor. The network controllers receive instructions from the central processor and store the instructions in buffer registers. This information is then used by a translator in the network controller to actuate equipment in the networks or ringing control circuits as required.

Communication between the central processor CP, the network controllers NC1 and NC2, the signal distributor SD, the scanners LS and SC, and other equipment is over a multiconductor bus system designated BUS.

As shown in the Doblmaier et al. disclosure, the central processor CP is a data processing facility for implementing the various administrative, operational and maintenance functions of the system. The central processor can be functionally divided into the central control unit CC, the call store CS and a program store PS. The call store has an erasable memory for storing frequently altered information pertaining to the availability of trunks and information pertaining to calls in progress such as the availability of a communication path through the line and trunk link networks. On the other hand, the program store has a memory which is employed to store work and maintenance programs and information which is not altered as frequently, such as the line link network location associated with a particular telephone directory number.

The central control CC is the primary information processing unit for the switching system. It is capable of executing many different types of basic instructions or orders for controlling the line link network, the trunk link network, and trunk circuits as well as other functional circuits. These instructions are recorded in program store PS and are used to inform the switching circuits of the system how and when to perform their various functions. The central control CC requests instructions from program store PS and executes, or commands the appropriate circuit to execute, the proper function. Thus, being the hub of the switching system, the central control CC also receives back answers from the units which it commands.

INCOMING CALL

The manner in which the switching system of FIG. 1 completes a call incoming from another switching office will now be described as it will be helpful for a clearer understanding of the present ringing arrangement.

When an interoffice trunk facility is selected at its originating office, a trunk connect signal is transmitted over the trunk conductors to the trunk circuit at the terminating office, such as incoming trunk circuit TA in FIG. 1. This trunk connect signal is detected by scanner SC which continually scans the supervisory condition of trunks and other circuits. As set forth in the Doblmaier et al. disclosure, the central control CC reads out of scanner SC the supervisory conditions of trunk circuit TA and consults the busy-idle information in call store CS to make sure that the trunk connect signal had not been previously observed.

The central control CC then seizes an incoming register in call store CS and records the trunk network location of the incoming trunk in the incoming register. The central control CC determines the type of pulsing that will be received over the incoming trunk circuit TA and utilizes the trunk link network TLN to connect an appropriate digit receiver to the trunk circuit. Digit receiver DR is shown in FIG. 1 and this receiver can be connected to trunk circuit TA over network connection 100.

The incoming register associated with the digit receiver DR is now prepared to receive the called number as it is outpulsed from the distant office, and a start dialing signal is sent to the distant office to cause the distant office to begin outpulsing the called number. When the last digit of the called number is received, the central control CC effects a translation of that number to obtain the line link equipment number and terminating class features of the called line. The central control CC thereafter converts the received line equipment number into the location of the line busy-idle data in the call store CS to determine if the called line is busy or idle.

In the above-identified Doblmaier et al. disclosure the central control then connected an audible ringing tone circuit to the incoming trunk using a channel in the trunk link network TLN and connected a ringing control circuit over the line and trunk link networks to the called line. In addition, the central control reserved a talking path between the incoming trunk and the called line. With that arrangement the incoming trunk was scanned for a possible abandoned call, while the ringing control circuit was scanned for the called line answer supervision. If the called party answered by lifting his receiver, the ringing connection between his line and a ringing control circuit was released and the audible ringing tone connection between the incoming trunk and the audible ringing circuit was released. The reserved talking path was then used to interconnect the incoming trunk circuit with the called line.

As seen from the above description of the Doblmaier et al. disclosure, each time a line is called in that system a separate network path is established for ringing the called line and another path is established for returning audible ringing tone over the incoming trunk. In addition, a talking path is reserved for interconnecting the called line with the incoming trunk. Moreover, when a ringing control circuit is coupled to a called line it cannot service other calls until the called party answers or until the call is abandoned by the calling party.

In accordance with one aspect of our invention, a network connection is established directly between the incoming trunk and the called line, and a ringing control circuit is coupled to this connection whenever ringing is required on a trunk. Depending on which trunk circuit requires a ringing signal, central control CC will operate via a network controller NC1 one of the relays RA–RF in FIG. 1. For example, let it be assumed that incoming trunk TA has been connected over a channel on the line link and trunk link networks LLN and TLN to line LA serving customer station CSA. The central control CC signals over bus system BUS to network controller NC1 to have the controller operate relay RA for two seconds out of every six-second interval. When relay RA operates its contacts in FIG. 1, the tip and ring conductors between trunk circuit TA and trunk link network TLN are split. Ringing current from a ringing generator coupled to ringing control circuit RCC is applied over conductors RG and over the network channel to actuate the ringer at called station CSA, while an audible ringing tone is applied over conductors AR and over the incoming trunk to inform the calling customer at the distant office that the called station is being rung.

This signal is applied for a two-second interval after which ringing control circuit RCC is disconnected and made available to serve other trunks. Assuming now that trunks TA, TB, and TC are each connected to a called station and each trunk requires a ringing signal, the central control CC would cause the network controller NC1 to sequentially operate relays RA, RB, and RC to successively connect the ringing control circuit RCC to each of the trunk circuits for two seconds. By sequentially coupling the ringing control circuit RCC to each trunk circuit for two seconds, each trunk can be rung while the other trunks are in their silent intervals.

Figure 4A:
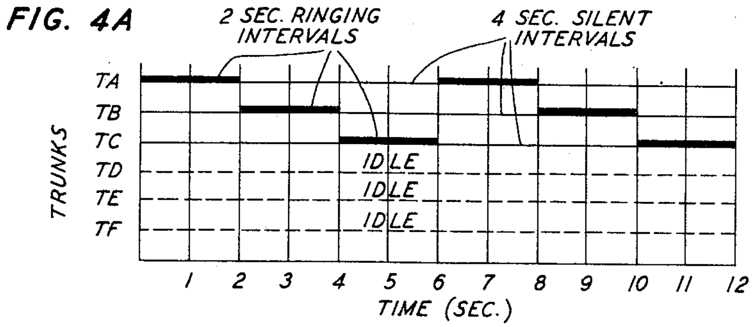

Turning now to FIG. 4A there is shown a sequence diagram illustrating the intervals during which each trunk is rung when three trunks TA, TB, and TC associated with ringing control circuit RCC require ringing. It can be seen from this diagram that trunk TA is in a ringing mode during the first two-second interval and in a silent mode during the following four seconds. It is during this four-second silent interval on trunk TA that the ringing control circuit RCC can be connected to trunk TB for two seconds and to trunk TC for two seconds to provide ringing on these two trunks as shown by the diagram in FIG. 4A.

Turning back to FIG. 1, let it be assumed that other trunks associated with ringing control circuit RCC are connected to customer stations and also require ringing to be transmitted to these stations. It is obvious that if the two-second ringing interval, four-second silent interval were maintained, ringing control circuit RCC could not serve more than three trunks simultaneously. In accordance with another feature of our invention, load detector LD monitors the number of trunks associated with ringing control circuit RCC that require ringing. As the number of trunks requiring ringing increases, the load detector LD signals ringing control circuit RCC to alter the ringing signal so that ringing control circuit RCC can serve more trunks within a prescribed interval.

The manner in which the signal is altered depends on the service requirements of the system. In the one exemplary embodiment of our invention we have illustrated an arrangement whereby each trunk is rung at least once every six seconds, and as more trunks require the services of ringing control circuit RCC, the ringing interval is shortened. For example, as shown in the sequence diagram of FIG. 4B, when four trunks TA, TB, TC, and TD require ringing, each trunk is connected to ringing control circuit RCC for 1.5 seconds thus providing a 1.5 second ringing interval and a 4.5 second silent interval. Similarly, as shown in FIG. 4C if the six trunks TA–TF associated with ringing control circuit RCC require a ringing signal, the ringing interval can be shortened to one second with a five-second silent interval.

As the number of trunks requiring ringing diminishes, load detector LD in FIG. 1 responds accordingly and signals ringing control circuit RCC to increase the length of the ringing signal a corresponding amount. When three or less trunks require ringing, the ringing interval provided by ringing control circuit RCC is returned to the normal two-second interval.

While the above described arrangement increases the capacity of a ringing control circuit RCC by shortening the ringing interval and ringing each trunk at least once every six seconds, the capacity of ringing control circuit RCC could also have been increased by maintaining a fixed ringing interval and lengthening the silent interval. All trunks associated with a particular ringing control circuit and requiring a ringing signal might be given an initial two-second ringing burst before the first rung trunk is provided with a second burst. Since a significant number of calls will be answered in response to the initial ringing burst, many of the trunks will not require an additional ringing signal thus permitting those trunks that do require a subsequent ringing burst to be rung within a reasonable interval after the initial ring.

DETAILED DESCRIPTION

Turning now to FIGS. 2 and 3, a more detailed description of this specific embodiment of our invention will now be given.

FIGS. 2 and 3 when arranged according to FIG. 5 show a portion of the telephone switching system previously described with reference to the block diagram in FIG. 1. FIG. 2 shows the trunk link network TLN, incoming trunks TA–TF, the central processor CP, signal distributor SD, load detector LD, and scanner SC.

While certain aspects of the trunk link network TLN are set forth in the above-identified Doblmaier et al. disclosure, a more detailed description of the network can be found in the following copending applications: A. Feiner, Ser. No. 253,083, filed Jan. 22, 1963, now Patent 3,257,-513 and K. S. Dunlap-A. Feiner-R. W. Ketchledge-H. F. May, Ser. No. 295,458, filed July 16, 1963, now Patent 3,281,539 and in Patent 3,231,679 to T. N. Lowry of Jan. 25, 1966. Since the trunk link network forms no part of the present invention a further description of this network will not be given herein.

A more detailed disclosure of the incoming trunk circuits can be found in FIG. 104 of the above-cited Doblmaier et al. application and need not be shown herein for a full understanding of the present invention. Instead, it will be sufficient to indicate that each trunk circuit is terminated in the trunk link network TLN over a pair of conductors T and R and the trunk circuits are connected over another pair of conductors T1 and R1 to the distant office.

The trunk circuits are equipped with pairs of scanning leads, and each pair of scanning leads is associated with a ferrod sensor in scanner SC. The ferrod sensor is a current sensitive device which is used to monitor the flow of current in a pair of wires. Each ferrod is essentially a transformer comprising a rod of ferrite material with two control windings C, an interrogate winding I and a readout winding R. The control windings are connected to the pair of wires to be monitored and the magnetic coupling between the interrogate winding and the readout winding is determined by the current flow in the control windings. Thus, when a ferrod sensor such as FS0 in FIG. 2 is connected to a called customer's line, the ferrod sensor can detect on-hook and off-hook signals from the called station. Ferrod sensors are further disclosed in the Patent 3,175,042 to J. A. Baldwin and H. F. May of Mar. 23, 1965.

As set forth in the Doblmaier et al. disclosure most of the control functions are performed by the central processor CP. Accordingly, the individual trunk circuits need only be equipped with the essential transmission and switching devices. These switching devices in most instances are magnetic latching relays which are controlled by signal distributor SD. Signal distributor SD functions as a buffer circuit between the high speed data processor CP and the slower speed relays whereby the trunk circuits are switched into different functional states by the signal distributor SD under control of programmed instructions from central processor CP.

In a similar manner, network controller NC1 is provided as a buffer circuit between central control CC and trunk link network TLN and ringing control circuit RCC. Network controller NC1 receives instructions from the central control and stores the instructions in a buffer register. A translator in the network controller then utilizes this information to actuate equipment such as closing crosspoints in the trunk link network or operating relays to couple the ringing control circuit to a connection requiring ringing.

Load detector LD in FIG. 2 is a traffic sensing device that responds to a plurality of trunk circuits to indicate how many trunk circuits require ringing. While the precise details of load detector LD are not part of the present invention an example of a typical load detector can be found in the copending patent application of G. Minchenko, Ser. No. 426,562, filed Jan. 19, 1965, now Patent 3,352,974. In the Minchenko disclosure there is shown a traffic sensing device capable of sensing different levels of trunk occupancy. As each trunk is taken for use a resistance network is altered accordingly, and when a sufficient number of trunks are occupied, a low overload trigger circuit is actuated. In the present invention this overload trigger circuit extends ground over low overload conductor LO to operate relay B in ringing control circuit RCC. As more trunk circuits become occupied a second trigger circuit in load detector LD is actuated and extends ground over a high overload conductor HI operating relay C in ringing control RCC. Of course, in the present invention the threshold detectors would not be responsive to trunk occupancy as in the Minchenko disclosure, but the detectors are arranged to respond to the number of trunks which require a ringing signal. Furthermore, the threshold levels need not be limited to high and low, but many different levels could be used without departing from the spirit and scope of our invention.

Turning now to FIG. 3, there is shown a portion of ringing control circuit RCC. As disclosed in the copending application of L. F. Goeller, Ser. No. 403,989, filed Oct. 15, 1964, now Patent 3,378,650 ringing control circuits are sometimes equipped for testing a customer line for leakage resistance, a cross with an external power source, etc. Since the circuitry for performing these and similar tests is not necessary for a full understanding of our invention this circuitry has not been disclosed in the present drawing, and it will be obvious to one skilled in the art how these features may be employed in the present invention.

Interposed between each trunk circuit and its appearance in the trunk link network TLN are contacts of a relay gate R–. These contacts of relays R– shown in FIG. 2 interrupt the T and R conductors of the trunk and extend the T and R conductors over conductors RG1, RG2, AR1 and AR2 to the ringing control circuit RCC. When relay RA is operated, for example, trunk TA is coupled to the ringing control circuit RCC. When relay RB is operated trunk TB is coupled to the ringing control circuit, etc., for the rest of the trunks shown in FIG. 2. It is over conductors RG1 and RG2 that ringing current is transmitted over the network to the called station, and it is over conductors AR1 and AR2 that an audible ringing signal is returned over the trunk to the calling subscriber to inform him that the called station is being rung.

Relays RA–RF are actuated by network controller NC1 which is under control of the central processor CP, and central processor CP determines from its program and scanner SC which of the trunks require ringing.

Also set forth in FIG. 3 is the logic means for controlling the ringing intervals. The logic means comprises three pulse divider circuits PDA, PDB, and PDC, which are operated by interrupter circuit IC to provide a timing circuit for timing the interval during which ringing control circuit RCC is coupled to a trunk to provide a ringing signal. Before describing the overall operation of the ringing arrangement, a description of the operation of the timing circuit comprising the pulse dividers PDA, PDB, and PDC and the interrupter circuit IC will first be given.

Interrupter IC can be any one of many well-known interrupter circuits and provides a series of ground pulses over conductor 300. In the one illustrative embodiment of our invention it will be assumed that interrupter IC provides a series of ground pulses each of 250 millisecond (ms.) duration and each spaced apart by a 250 ms. interval.

Let it be assumed that relay RR is operated so that its make contacts RR1 are closed extending the ground pulses from interrupter IC and conductor 300 over conductor 301 to the first pulse divider PDA. This ground pulse extends through break contacts WA1, through the winding of relay WA and through make contacts RR4 to battery, operating relay WA. Relay WA, in operating, locks through its own make contacts WA1. The locking ground for relay WA also extends over conductor 302 to the left side of the winding of relay ZA. Relay ZA does not operate at this time since the right side of its winding is also at ground potential as long as the 250 millisecond pulse from interrupter IC is present on conductor 301.

At the end of the first 250 millisecond pulse, ground is removed from conductor 301 and the right side of the winding of relay ZA, and relay ZA operates to the ground through make contacts WA1. When relay WA initially operated it also extended ground through its make contacts WA2 and over conductor 304 to operate relay WB in pulse divider PDB. Similarly, when relay WB operates it extends ground through its make contacts WB2 and over conductor 303 to operate relay WC in pulse divider PDC.

Returning now to the description of pulse divider PDA, it will be recalled that the first 250 millisecond ground pulse had been received and relays WA and ZA are operated. Upon receipt of the next 250 millisecond ground pulse on conductor 301, the ground is extended through make contacts ZA1 to the right side of relay WA. Relay WA, also having ground on the left side of its winding, is shunted down. Relay WA, in releasing, opens its make contacts and closes its break contacts WA1, and relay ZA is held operated for the duration of the second 250 millisecond pulse. At the end of that pulse, ground is removed from conductor 301 and relay ZA releases.

Figure 4B:
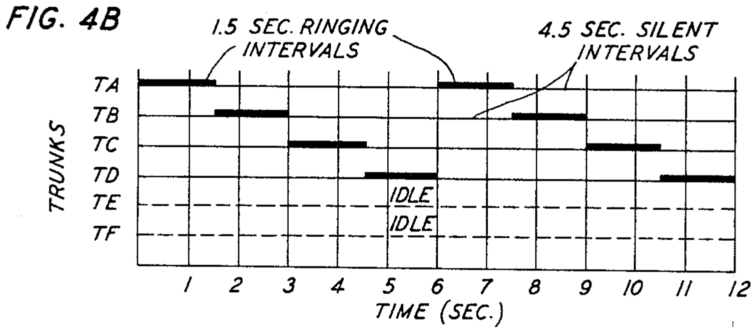
Figure 4C:
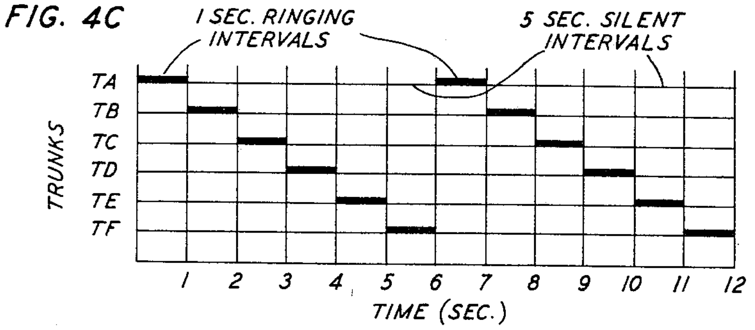
Figure 4D:
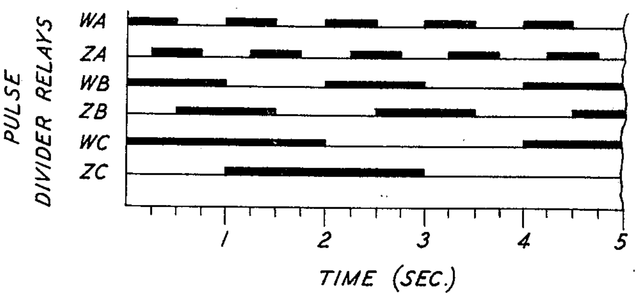

To aid the reader in understanding the operation of the pulse divider circuits, a time sequence chart has been included in FIG. 4D of the drawing. FIG. 4D depicts the intervals during which various relays of the pulse dividers are operated, assuming no recycling due to the release of relay RR, as discussed further below. The graph in FIG. 4D has been arranged with a time scale along the horizontal coordinate, wherein each small graduation along the scale indicates one quarter of a second (250 milliseconds). The designations for the relays of the pulse dividers have been placed along the vertical axis, and an operated relay is indicated by a heavy-weight horizontal line opposite the relay designation, while a released relay is indicated by a light-weight line. Thus, it can be seen from FIG. 4D that relay WA is operated for the first half-second, released for the next half-second, and operated for the interval between 1.0 and 1.5 seconds, et cetera, while relay ZA is operated during the intervals between 0.25 second and 0.75 second, 1.25 seconds and 1.75 seconds, et cetera.

The other pulse dividers PDB and PDC function in the same manner as pulse divider PDA, except that pulse divider PDB is driven from ground pulses derived from pulse divider PDA, and pulse divider PDC is driven from ground pulses derived from pulse divider PDB. In this manner the relays of the pulse dividers will be held operated and released for different intervals of time using the single interrupter IC. For example, it can be seen in FIG. 4D that relay WB is operated for a one-second interval during the first, third, and fifth-second intervals, while relay ZB is operated during the intervals between 0.5 and 1.5 seconds, 2.5 and 3.5 seconds, et cetera. Similarly, relay WC is held operated for the first two-second interval and released for the next two-second interval, while relay ZC is operated for the two-second interval between 1.0 and 3.0 seconds and released for the two-second interval between 3.0 and 5.0 seconds in the diagram.

Using various combinations of the pulse divider relays, the ringing control circuit RCC in FIG. 3 can be made to provide ringing signals of different durations. Of course it will be obvious to those skilled in the art that other timing arrangements can be used to alter the ringing signal without departing from spirit and scope of our invention.

INCOMING CALL

To illustrate the operation of the invention let it be assumed that trunk circuit TF has been seized at its originating office (not shown) and that trunk TF is to be connected over trunk link network TLN to a called station in the local office, part of which is shown in FIG. 2. When the trunk circuit TF is seized a loop including conductors T1 and R1 is completed and current flows in the control windings C of ferrod sensor FS1 in scanner SC. As set forth in the Doblmaier et al. disclosure the central control CC reads out of scanner SC the supervisory condition of trunk circuit TF and consults the busy-idle information in call store CS to make sure that the trunk connect signal had not been previously observed.

The central control CC then seizes an incoming register in call store CS and records the trunk network location of the incoming trunk circuit in the incoming register. The central control CC determines the type of pulsing that will be received over incoming trunk circuit TF and connects an appropriate digit receiver over the trunk link network TLN to the trunk. The connection of the digit receiver to the incoming trunk has been described with reference to the block diagram in FIG. 1.

The incoming register associated with the digit receiver is now prepared to receive the called number as it is outpulsed from the distant office. When the last digit is received the central control CC effects a translation of the called number to obtain a line link network location of the called line. The central control CC thereafter converts the received line equipment number to the location of the busy-idle data in the call store to determine if the called line is busy or idle.

Let it be assumed that the called line is idle and the central control selects and establishes an idle channel between the trunk link network appearance of trunk TF and the called line appearance in the line link network LLN. The central control is programmed to direct network controller NC1 to actuate the proper relay gate to couple the ringing control circuit RCC to the T and R conductors of trunk circuit TF. In the example under consideration network controller NC1 extends ground over conductor NCF through break contacts RF1 through the winding of relay RF back over conductor 200, through break contacts TO1 and make contacts RTA1 and through the winding of relay RR to battery. Both relays RF and RR operate over this circuit, and when relay RF operates it closes its make contacts RF1 to provide a locking circuit for relays RF and RR.

The above circuit for operating relays RF and RR was traced through operated contacts RTA1 of relay RTA. Relay RTA was operated priorly from ground through break contacts RR2, and when relay RTA operates it completes a locking circuit through its own make contacts RTA2 to ground through break contacts RT1.

With relay RF operated the T and R conductors are interrupted between trunk circuit TF and the network terminal in trunk link network TLN for trunk circuit TF to permit ringing current and audible ringing tone to be transmitted over the connection. More specifically, ringing current from ringing generator RG in FIG. 3 is extended through the winding of ring trip relay RT over conductors RG1 and RG2 to FIG. 2 through make contacts RF2 and RF3 over conductors T and R to the trunk link network TLN and over a network channel to the called station to actuate the telephone ringer thereat. To inform the calling customer that the called station is being rung, an audible ringing tone from source ART in FIG. 3 is extended over conductors AR1 and and AR2, through capacitors C1, through make contacts RF4 and RF5 over conductors T and R to trunk circuits TF and back over the interoffice trunk facilities to the calling customer's station.

When relay RR operated it completed a circuit for operating relay WA in pulse divider PDA. This circuit includes ground pulses from interrupter IC, conductor 300, break contacts ZC2, make contacts RR1, conductor 301, break contacts WA1, the winding of relay WA and break contacts RR4. Pulse dividers PDA, PDB, and PDC will begin operating their associated W– and Z– relays for providing different time intervals during which ringing control circuit RCC is coupled to a particular trunk circuit.

Since it has been assumed that only truck circuit TF requires a ringing signal, no control signals will be transmitted from load detector LD over conductors LO and HI to operate relays B and C and a normal two-second burst of ringing power will be furnished to trunk circuit TF.

Relay WA, in operating, closes its contacts WA2 to operate relay WB and relay WB closes its contacts WB2 to operate relay WC in pulse divider PDC. When relay WA in pulse divider PDA operates it also completes a circuit for operating relay CT. This circuit can be traced from battery through the winding of relay CT, break contacts C1, make contacts WA3, break contacts ZC3 or make contacts WC3 and through make contacts RR2 to ground. Relay CT operates and opens its break contacts CT1 to prevent timeout relay TO from operating and releasing the ringing control circuit RCC from the connection to trunk circuit TF until a two-second ringing interval has elapsed.

It will be recalled from the above description with reference to FIG. 1 and the time sequence chart of FIG. 4 that relay WC operates almost immediately upon receipt of the first ground pulse from interrupter IC, and relay WC remains operated for two seconds, while relay ZC is operated during the interval between 1.0 and 3.0 seconds. Therefore at the end of the first two-second interval when relay WC releases and relay ZC is operated, the path for operating relay CT is interrupted at contacts WC3 and ZC3 and relay CT releases.

When relay CT releases a circuit is completed for operating time-out relay TO. This circuit includes ground through make contacts WA4, break contacts CT1 and the winding of relay TO. Relay TO, in operating, opens its break contacts TO1 to interrupt the holding circuit for relays RR and RF. Relays RR and RF release, and relay RF in releasing restores its contacts RF2–RF5 in FIG. 2 to normal thereby disconnecting ringing control circuit RCC from trunk circuit TF. Relay RR, in releasing, opens its contacts RR4–RR6 to release the W– and Z– relays to recycle the pulse divider circuits in preparation for the next ringing cycle.

The trunk circuit TF will remain disconnected from ringing control circuit RCC for approximately four seconds which is equivalent to the silent interval of the ringing signal. After the four-second silent interval if the called party has not answered or if the calling party has not abandoned the call, the central control CC will signal network controller NC1 to reoperate relay RF thereby reconnecting ringing control circuit RCC to trunk circuit TF to provide another burst of ringing.

Should the calling party abandon the call during one of the silent intervals the central control CC would detect the on-hook supervision from the calling office via scanner SC and the central control would not cause network control NC1 to reconnect the ringing control circuit RCC to trunk circuit TF for another ringing period. If the call is abandoned during the ringing period the ringing control circuit RCC is permitted to finish that ringing cycle and the central control CC is informed via scanner SC in the same manner so that the ringing control circuit RCC is not reconnected to the trunk circuit for another ringing burst.

An answer supervisory signal from the called station can occur during the ringing or silent interval of a ringing signal. If the called station goes off hook during the silent interval when ringing control circuit RCC is disconnected from the trunk circuit the low impedance in the called line circuit will cause current to flow through the control windings C of ferrod sensor FS0. This off-hook condition is detected in scanner SC, and central control CC is informed that the called station has responded to the ringing signal and a ringing control circuit need not be reconnected to the connection to provide additional ringing signals. If the customer at the called station lifts his receiver during a ringing interval when ringing control circuit RCC is coupled to the network connection between the incoming trunk circuit TF and trunk link network TLN, the low impedance condition of the called line causes ring trip relay RT in FIG. 3 to operate in a well-known manner. When ring trip relay RT operates it opens its break contacts RT1 to interrupt the holding circuit for relay RTA and relay RTA releases. Relay RTA, in releasing, opens its make contacts RTA1 to interrupt the holding circuit for relays RR and RF. Both relays RR and RF release, and as described above, when relay RF releases ringing control circuit RCC is disconnected from the trunk circuit (TF) currently being rung.

In the above-described example, trunk circuit TF was the only circuit requiring a ringing signal from ringing control circuit RCC. It was therefore possible to provide trunk circuit TF with the full two-second ringing burst every six seconds. Assuming now that three trunk circuits such as trunk circuits TA, TB, and TC have been selected for use and require the service of ringing control circuit RCC, central control CC would cause their ringing gate relays RA, RB and RC to operate in sequence so that each of the trunk circuits TA, TB, and TC would receive a two-second ringing burst. More specifically, the central control CC via network control NC1 would first cause relay RA to operate for two seconds to provide a two-second ringing burst for trunk circuit TA. After the two-second ringing interval on trunk circuit TA, that is, when trunk circuit TA is in its four-second silent mode the central control CC would cause relay RB to operate for two seconds followed by the operation of relay RC to provide a ringing burst for each of the trunk circuits TB and TC. At the end of the two-second ringing interval for trunk circuit TC which also corresponds to the end of the four-second silent interval for trunk circuit TA, the trunk circuit TA could once again be connected to ringing control circuit RCC to provide an additional ringing burst on that trunk circuit if required. Each time an R– relay is operated to connect ringing control circuit RCC with its associated trunk circuit, relay RR also operates to begin the operation of pulse dividers PDA, PDB and PDC for timing the next ringing interval.

For a graphic illustration of how trunks TA, TB, and TC could be served by ringing control circuit RCC the reader's attention is directed to FIG. 4A of the drawing. In FIG. 4A, there is depicted a time sequence chart with one-second time intervals marked off along the horizontal access and with the trunk designations TA–TF along the vertical axis. Adjacent to the trunk designations are horizontal lines. The heavyweight lines indicate when ringing control circuit RCC is connected to a particular trunk (i.e., the ringing interval) and the lightweight lines indicate when ringing control circuit RCC is disconnected from the trunk circuit (i.e., the silent intervals). It can be seen from the drawing that three trunk circuits can be accommodated by a ringing control circuit to provide a two-second ringing burst every six seconds.

VARIABLE RINGING SIGNAL

Let it now be assumed that an additional trunk circuit TF requires ringing along with trunk circuits TA, TB, and TC. In accordance with one feature of this illustrative embodiment of our invention the ringing signal will be altered in such a manner to permit the ringing control circuit RCC to be shared by all four trunk circuits.

When four trunk circuits are selected and require ringing, load detector LD in FIG. 2 responds by transmitting a ground signal over low overload conductor LO to operate load indicating relay B in ringing control circuit RCC. The operation of relay B in ringing control circuit RCC causes the ringing interval to be reduced to 1.5 seconds thereby permitting four trunks each to be rung for a 1.5 second interval every six seconds. This is accomplished in the following manner. It will be recalled that when ringing control circuit RCC is connected to a trunk circuit such as trunk circuit TA, relays RA and RR were operated and relay RR caused the pulse divider circuits PDA, PDB, and PDC to operate. The length of time during which ringing control circuit RCC is connected to a particular trunk circuit is determined by the release of relay CT which, in turn, operates time-out relay TO to release the ringing control circuit RCC from a connection.

In the prior example with three or less trunk circuits busy, both load indicating relays B and C were normal and the release of relay CT was controlled by the opening of both contacts ZC3 and WC3. It will be recalled with reference to FIG. 4D that connects ZC3 and WC3 will be opened simultaneously when relay ZC3 is operated and relay WC3 is released at the end of the first two-second interval, thereby providing the two-second ringing interval during which ringing control circuit RCC is connected to a trunk circuit. With load indicating relay B operated, its break contacts B1 are opened and the release time of relay CT is now controlled by the opening of contacts WA3 and WB3. Contacts WA3 and WB3 will be opened simultaneously at the end of 1.5 seconds when both relays WA and WB are released. Thus relay CT releases at the end of 1.5 seconds completing the previously traced circuit for operating relay TO, and when relay TO operates it releases relay RR and one of the relay gates RA–RF to disconnect ringing control circuit RCC from the corresponding trunk circuit.

The manner in which the four trunk circuits TA–TD are each rung for a 1.5 second interval every six seconds is further illustrated by the time sequence chart in FIG. 4B of the drawing. It can be seen from FIG. 4B that trunk TA is rung during the first 1.5 second interval and is in its silent mode during the interval between 1.5 seconds and 6.0 seconds. Similarly, trunk circuit TB can be rung during the interval between 1.5 and 3.0 seconds, while trunk circuit TA is in its silent mode.

Of course, it will be realized that the order in which the trunks are rung depends, in part, on which trunk is seized and connected to a call subscriber first under control of the central control. Likewise, if the call on a trunk circuit such as trunk circuit TB is abandoned or answered and trunk circuit TB no longer requires a connection to ringing control circuit RCC, the time slot formerly used to ring trunk circuit TB can be used to ring other trunk circuits.

As long as the level of trunks requiring ringing remains the same load indicating relay B will remain operated by load detector LD and a 1.5 second ringing interval will be furnished by ringing control circuit RCC. Should more trunk circuits such as trunk circuits TE and TF require ringing, the ringing signal can be further altered to permit ringing control circuit RCC to serve these trunks. As additional trunks require ringing, load detector LD transmits ground over conductor HI to operate load indicating relay C in FIG. 3. When relay C operates it opens its break contacts C1 in the operating path of relay CT. With both load indicating relays B and C operated the release time of relay CT is controlled by the opening of make contacts WB3 of relay WB, and it can be seen from the sequence diagram of FIG. 4D that relay WB releases at the end of the first one-second interval. Relay CT therefore will release after approximately one second causing time-out relay TO to operate and disconnect the ringing control circuit RCC from one of the trunk circuits.

Thus, from the foregoing description it can be seen that ringing control circuit RCC can be used to supply ringing to different quantities of trunk circuits depending upon the demand for ringing as detected by load detector LD. When the demand for a ringing signal is small i.e., three or less trunks require ringing as in the example described, the ringing control circuit RCC can furnish a two-second ringing burst every six seconds. As a number of trunks requiring ringing increases to four, for example, the load detector causes the ringing interval to be shortened to 1.5 seconds so that each of the four trunks can be rung once every six seconds. As further trunks require a ringing signal the ringing interval can be further shortened to one second permitting all six trunks to be rung every six seconds.

It is to be understood that the above-described arrangements are illustrative of the application of the principles of the present invention. Numerous other arrangements may be devised by those skilled in the art without departing from the spirit and scope of the invention.

For example, instead of altering the ring interval to accommodate more trunks the ringing period could be kept constant and the silent interval could be altered, or both the ringing and silent intervals could be altered to accommodate additional trunks. In other words, all trunks which have not been rung would take preference and receive at least one burst of ringing current before the other trunks which already have been rung at least once would receive additional bursts of ringing. Also, it should be realized that the method described herein for detecting the number of trunks requiring a ringing signal is merely exemplary and other means can be provided. For instance, logic and memory apparatus in the central processor could be used to record the number of trunks requiring ringing. The central processor CP can then actuate the appropriate circuitry in the ringing control circuit RCC to control the ringing interval, or in the alternative cause the ringing control circuit to be connected to a particularly trunk for a given interval.

Finally, the disclosed apparatus can be made to accommodate other types of ringing signals such as coded ringing schemes or multifrequency tone signaling without departing from the spirit and scope of our invention.

What is claimed is:

1. In a telephone system, a plurality of called customer lines; a plurality of communication paths; switching means for interconnecting said lines with said paths; and means for transmitting a ringing signal to lines connected to said paths comprising a ringing circuit, means for coupling said ringing circuit to each of said interconnected paths for prescribed intervals of time, and means governed by the number of paths required said ringing signal for controlling said intervals.

2. The invention defined in claim 1 wherein said transmitting means also comprises means for ascertaining the number of interconnected paths requiring said ringing signal and wherein said control means includes circuit means responsive to said ascertaining means.

3. The invention defined in claim 2 wherein said ascertaining means comprises means for detecting distinct quantities of paths requiring said ringing signals and wherein said circuit means comprises logic means responsive to said detecting means for controlling said intervals in accordance with each distinct quantity of paths detected.

4. The invention defined in claim 3 wherein said ringing circuit comprises a ringing power source, wherein said coupling means comprises a plurality of gating means each associated with one of said paths, wherein said ascertaining means further comprises means for selectively enabling said gating means, and wherein said circuit means also comprises means for automatically disabling any said gating means.

5. The invention defined in claim 4 wherein said logic means comprises means for timing a plurality of intervals and wherein said detecting means comprises means for selecting one of said intervals in accordance with the number of said paths requiring said ringing signals.

6. In a telephone system, a plurality of called customer lines each having a station adapted to transmit an answer signal in response to the receipt of a ringing signal, a plurality of trunks, switching means for establishing communication paths between said lines and trunks, a ringing circuit, and means for time-sharing said ringing circuit among said paths comprising means for selectively coupling said ringing circuit to individual paths for an interval of time determined by the number of paths requiring said ringing signal.

7. The invention defined in claim 6 wherein said ringing circuit comprises means responsive to an answer signal on a particular one of said paths for uncoupling said ringing circuit from said particular path.

8. The invention defined in claim 7 wherein said coupling means comprises a plurality of connecting means each effective when enabled for connecting said ringing circuit to a corresponding one of said paths, and wherein said time-sharing means also comprises detecting means for ascertaining the number of paths requiring a ringing signal and means for selectively enabling each said connecting means only for a prescribed interval as determined by said detecting means to permit all paths requiring a ringing signal to be connected to said ringing circuit within a predetermined time.

9. The invention defined in claim 8 wherein said enabling means comprises apparatus for timing the duration that one of said connecting means is enabled, and wherein said detecting means includes indicating means operative to control said timing means in accordance with the number of paths requiring said ringing signal.

10. The invention defined in claim 9 wherein said station comprises a telephone ringer, wherein said ringing circuit comprises a source of power for actuating said ringer and an audible tone source, wherein said connecting means comprises means for interruptilng its associated path between said trunk and said line and connecting said power source to the line side of said interrupted path and for connecting said tone source to the trunk side of said interrupted path, wherein said timing apparatus comprises means for measuring a plurality of different intervals of time and wherein said indicating means includes means for selecting a particular one of said different intervals.

11. In a telephone system, a plurality of called lines, a plurality of paths connectable to said lines, control means responsive to service request signals from said paths for applying ringing signals to a number of said lines, said signals having a time cycle of operations, means for detecting the number of paths for which ringing signals are to be applied to said lines, and means responsive to said detecting means for altering the time cycle of operations of said signals to cause said control means to apply said signals to more than said number of said lines.

References Cited

UNITED STATES PATENTS 2,385,715 9/1945 Lomax et al. ---------- 179—84

KATHLEEN H. CLAFFY, Primary Examiner

T. W. BROWN, Assistant Examiner

U.S. Cl. X.R.

179—84